April 28, 1931.  E. J. FARKAS  1,802,911
AIR WASHER
Filed Sept. 23, 1929   2 Sheets-Sheet 1
Fig-1-
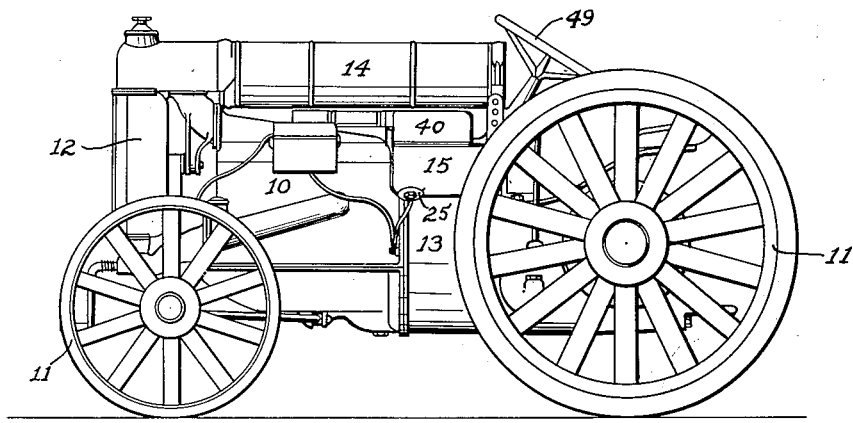
Fig-4-
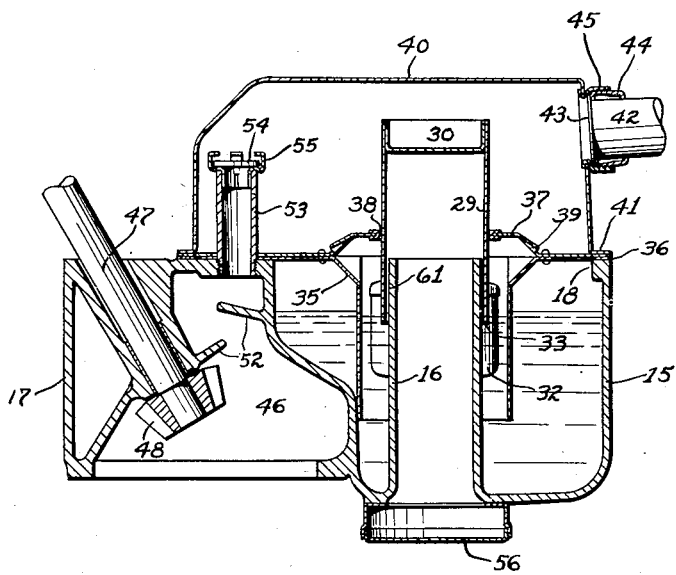
INVENTOR
Eugene J. Farkas
BY
ATTORNEY April 28, 1931.  E. J. FARKAS  1,802,911
AIR WASHER
Filed Sept. 23, 1929   2 Sheets-Sheet 2
FIG-2-
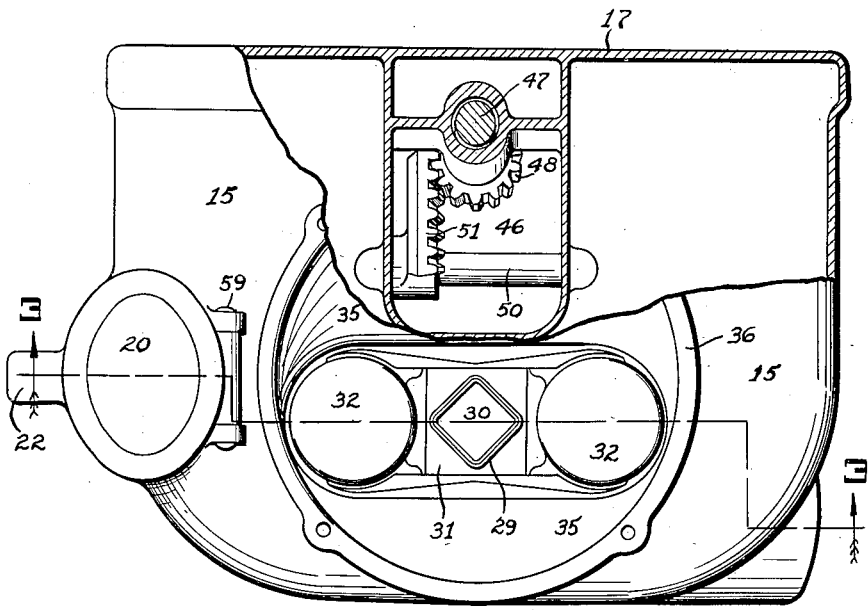
FIG-3-
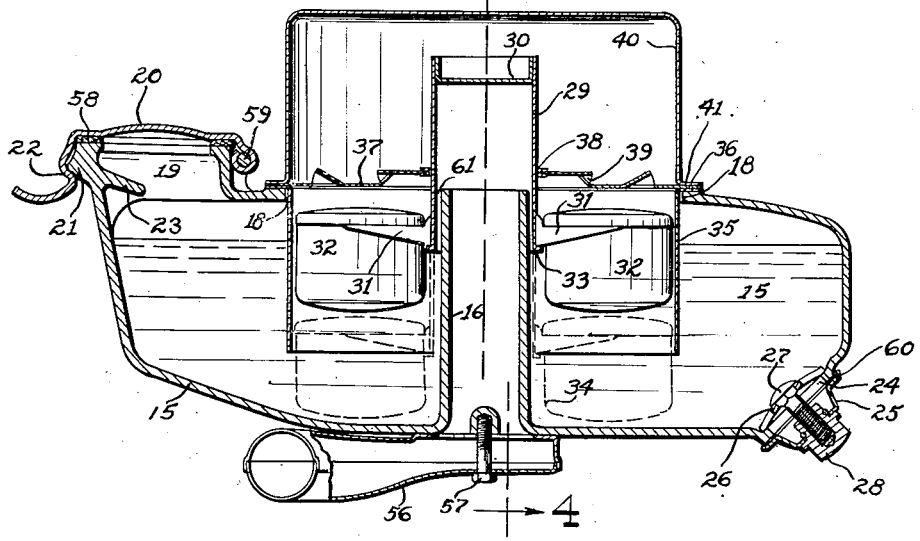
INVENTOR
Eugene J. Farkas
BY
ATTORNEY Patented Apr. 28, 1931

1,802,911

UNITED STATES PATENT OFFICE

EUGENE J. FARKAS, OF DETROIT, MICHIGAN, ASSIGNOR TO FORD MOTOR COMPANY, OF DEARBORN, MICHIGAN, A CORPORATION OF DELAWARE

AIR WASHER

Application filed September 23, 1929. Serial No. 394,437.

The object of my invention is to provide an air washer of simple, durable and inexpensive construction.

A further object of my invention is to provide an air washer for use with farm tractors which will wash the air supplied to the engine carburetor, and which will have a relatively large water capacity while at the same time occupying a minimum of space on the tractor.

Still a further object of my invention is to provide an air washer having a water reservoir which is not subject to the intake manifold vacuum so that the reservoir may be filled while the engine is operating and so that there will be no tendency to draw air through the water filler opening.

The Patent 1,466,500, issued August 28th, 1923 to Henry Ford shows a type of air washer which is provided with a screw type filler opening plug. If this plug does not form an air tight seal with the water reservoir, uncleaned air will enter the carburetor at this point. Consequently, a screw type plug was provided which when tightened down with a wrench produced such a seal. The water reservoir in such devices must be replenished several times a day when the tractor is used continuously and great inconvenience is caused by having to tighten this plug down with a wrench after each filling. Further, it is extremely difficult to tell when an air tight joint is obtained as the opening is above the water level in the reservoir.

My improved air washer is provided with an inverted air chamber extending into the water reservoir below the water level. This chamber is connected with the carburetor intake manifold while the portion of the reservoir outside of the chamber is not connected with the manifold. It is, therefore, not necessary or even advantageous to maintain an air tight seal at the water filler opening. A readily detachable snap type filler opening cap is provided over the water filler opening the only function of which is to prevent loss of water through this opening from surging in the water reservoir. It may be found desirable in some installations to simply leave an opening in the reservoir into which water may be poured and provide no cap whatever because what little dirt would normally fall into the opening would be deposited in the water in the reservoir and could not, therefore, enter the engine carburetor.

A further function of the inverted air chamber is to prevent the surging of the water in the reservoir from effecting the normal level of the floats which are within the air chamber. Undue wear and variation in the height of the water column are obtained in air washers not provided with this air chamber. With this device the water level within the air chamber is practically constant, depending on the mean water level in the reservoir, so that there is very little wear on the float guide member, and a practically constant height of water column is obtained.

Still a further object of my invention is to provide a combined air washer, tractor dash, and steering gear housing. In my improved device the rear wall of the water reservoir forms the dash of the tractor while a chamber is provided within this reservoir which houses the steering gear mechanism. A more compact and lighter unit is thus secured which is also cheaper to manufacture.

Still a further object of my invention is to provide an air washer for motor tractors which will wash the air supplied to the engine carburetor and which will also conduct the fumes from the engine crank case to the carburetor.

Still a further object of my invention is to provide an air washer in which the air to be washed is drawn through a column of water into an air chamber and is then drawn upwardly through louvers in a diaphragm which divides the chamber into two compartments. This diaphragm member prevents the water spray which is produced as the air flows upwardly through the water column from entering the engine carburetor.

With these and other objects in view, my invention consists in the construction, combination, and arrangement of the various parts of my improved device, as described in the specification, claimed in my claims, and illustrated in the accompanying drawings, in which:

Figure 1 shows a side elevation of a tractor having my improved air washer installed thereon.

Figure 2 shows a plan view of the air washer, the upper half of the chamber being removed and parts of the water reservoir broken away to better illustrate the construction.

Figure 3 shows a sectional view taken on the line 3—3 of Figure 2, and

Figure 4 shows a sectional view taken on the line 4—4 of Figure 3.

Referring to the accompanying drawings, I have used the reference numeral 10 to indicate generally an engine associated with a tractor having wheels 11, radiator 12, transmission housing 13, and fuel tank 14. My improved air washer is secured to the transmission housing 13 just to the rear of the engine 10, beneath the fuel tank 14.

This air washer consists of a water reservoir 15 having a square section air intake pipe extending vertically up through the center so that air may be drawn into the device. The rear wall 17 of the reservoir 15 extends across the tractor so that it may form a dash and rear support for the tank 14. The top wall of the reservoir is provided with a large circular opening 18 over which an air chamber is secured.

A water filler opening 19 is formed in one side of the reservoir 15 above the normal water level and is provided with a cap 20 having a gasket 58, the cap being pivotally secured to the reservoir by means of a pivot pin 59. A lug 21 extends from the reservoir 15, adjacent to the opening 19, with which a snap fastener 22 on the cap 20 co-acts to resiliently hold the cap 20 in its closed position. A baffle plate 23 is formed below the opening 19 so that surging of the water in the reservoir will not act directly on the cap 19.

A clean out opening 24 is provided near the bottom of the reservoir and a cap 25 is secured over this opening by means of a yoke 26, bolt 27, nut 28, and gasket 60. As the cap 25 must only be removed at rare intervals for cleaning the sediment from the water reservoir, the use of a wrench thereon is not a serious objection.

A squared tube 29 having a cover 30 over its upper end is reciprocally mounted over the upper end of the pipe 16. The lower end 33 of this tube is secured to a float supporting member 31 to which a pair of metallic floats 32 are secured. The floats 32 are so proportioned that the end 33 of the tube 29 will be slightly below the water level in the reservoir 15. A passageway 61 is provided between the pipe 16 and the tube 29 so that air may enter through the pipe, then through the passageway 61 and beneath the end 33 of the tube 29 where it may rise to the surface of the water in the reservoir 15.

When the reservoir 15 is provided with water the floats 32 lift the tube 29 upwardly around the pipe 16. The lower end 33 of the tube 29 is thus maintained at a constant depth below the surface of the water in the reservoir so that regardless of whether the floats are in the positions shown by solid lines in Figure 3 or in the position shown by the dotted lines 34, this depth will remain constant.

An inverted cup shaped air chamber is provided over the opening 18 which in this design of device is built up from three individual pieces. A tubular member 35 having a radial flange 36 extends down into the opening 18 so that its lower end is below the lowest operable water level in the reservoir 15. The portion of the tube adjacent to the floats 32 is elongated to provide only a small space between the tube and the floats. It will be noted that there is ample space for water to enter the float compartment beneath the tube 35 to maintain similar levels in the float chamber and water reservoir.

A diaphragm 37 is secured over the flange 36 and is provided with a squared opening 38 through which the tube 29 is free to reciprocate while at the same time it is guided centrally over the pipe 16. A plurality of louvers 39 are formed in the diaphragm 37 so that air may freely flow through this diaphragm.

An air chamber 40 made in the form of an inverted cup member is provided with a flange 41 which co-acts with the outer edges of the diaphragm 37. The flange 41, diaphragm 37, and flange 36 are secured with suitable screws over the opening 18 so that air which enters the chamber 40 must be drawn up through the louvers 39 in the diaphragm 37. When the water level in the reservoir 15 is above the lower end of the member 35, the air is forced to travel beneath the lower end 33 of the tube 29 which action washes the dust from the air. The action of the louvers 39 removes the water spray from the air before it enters the chamber 40 thereby providing clean dry air in the reservoir.

A pipe 42 having a flange 43 extends from the engine carburetor and is secured to the chamber 40 by a suitable nut 44 co-acting with threads 45.

Referring to Figures 2 and 4, a housing 46 is formed in the reservoir 15 for the tractor steering gear mechanism. The lower wall of this housing 46 is opened so that when the air washer is secured to the engine transmission a direct passageway will be obtained between these two members. Lubricant from the transmission 13 will thus be thrown up into the housing 46 to constantly lubricate the steering gear mechanism.

A steering gear shaft 47 is rotatably mounted in the rear wall of the housing 46 and is provided with a pinion 48 secured to its lower end and a steering wheel 49 fastened on its upper end. A transversely mounted shaft 50 is provided in the transmission housing 13 to which a sector gear 51 in mesh with the pinion 48 is secured.

A pair of baffle plates 52 are provided in that portion of the chamber 46 above the pinion 48. A pipe 53 extends upwardly from the chamber 46 and is provided with a flap valve 54 over its upper end thereof. A plurality of guide members 55 secured to the pipe 53 serve to guide the flap valve 54 and limit its movement.

In this type of tractor the engine and transmission unit form a single chamber so that fumes developing in the engine crank case may flow through the transmission 13, into the housing 46, around the baffle plates 52, through the pipe 53, and beneath the flap valve 54, thereby entering the air chamber 40. The fumes are then drawn into the engine carburetor through the pipe 42. This construction not only eliminates the obnoxious odors from the ordinary breather pipe but also adds considerably to the fuel economy of the engine.

In extremely dusty territory it may be found desirable to conduct the air supplied to the air cleaner from a point well above the ground. I have, therefore, provided a conduct 56 which is secured to the lower end of the pipe 16 by means of a bolt 57. The conduct 56 extends outwardly to one side of the transmission where a suitable pipe, not shown in the drawings, may be secured thereto and air drawn from any desirable part of the tractor.

Among the many advantages arising through the use of my improved device, it may be well to mention that the inverted air chamber prevents surging of the water in the reservoir 15 from affecting the mean float level within the chamber. Further, the filler opening cap is not subject to the intake manifold vacuum so that air leaks at this point do not allow unwashed air to enter the carburetor.

Further, a snap fastener is provided over the water filler opening so that it may be conveniently opened and the reservoir filled even though the engine is operating.

Still a further advantage results because the applicant's arrangement permits the steering gear mechanism to be lubricated by the vapor emerging from the engine breather tube and further it conducts this vapor into the intake manifold in a very simple manner so as to eliminate the odors from the ordinary engine breather pipe construction.

Still a further advantage results because a simpler, lighter and cheaper construction is obtained by combining the air washer, dash, and steering gear housing as is done in this device.

Some changes may be made in the arrangement, construction, and combination of my improved device without departing from the spirit of my invention, and it is my intention to cover by my claim such changes as may reasonably be included within the scope thereof.

I claim as my invention:

1. In an engine air washer, a water reservoir, an inverted cup shaped housing secured over said reservoir to form an air chamber, a carburetor air inlet pipe connecting said chamber with the engine carburetor, means for conducting air through the water in said reservoir into said chamber to thereby supply washed air to the engine carburetor, a steering gear housing forming a passageway between the engine crank case and said air chamber so that the gases and oil vapor from the crank case will be drawn through said passageway into the carburetor, and a steering gear mechanism disposed in said steering gear housing in position to be lubricated by the oil vapor being conducted therethrough.

2. In an engine air washer, a water reservoir having an air chamber formed in the upper portion thereof, a carburetor air inlet pipe connecting said chamber with the engine carburetor, means for conducting air through the water in said reservoir into said chamber to thereby supply washed air to the engine carburetor, a steering gear housing cast integrally with said reservoir forming a passageway between the engine crank case and said air chamber so that the gases and oil vapor from the crank case will be drawn through said passageway into the carburetor, and a steering gear mechanism disposed in said steering gear housing in position to be lubricated by the oil vapor being conducted therethrough.

3. In a device of the character described, a water reservoir having one wall forming a dash, means for conducting air through said reservoir into the engine carburetor, a steering gear housing formed by the walls of said reservoir, and a steering gear disposed in said housing, the parts being so apertured that a continuous passageway is formed between the engine crank case and the steering gear housing and the reservoir and the engine carburetor to thereby automatically lubricate the steering gear.

September 14, 1929.

EUGENE J. FARKAS.